United States Patent [19]

Pray et al.

[11] Patent Number: 4,866,102

[45] Date of Patent: Sep. 12, 1989

[54] MOLDABLE ENERGY ABSORBING RIGID POLYURETHANE FOAMS

[76] Inventors: Edward R. Pray, 240 S. Melborn, Dearborn, Mich. 48124; John R. Stoll, 19343 Lancaster, Woodhaven, Mich. 48183; Peter F. Plank, 15055 Garfield, Redford, Mich. 48239

[21] Appl. No.: 123,186

[22] Filed: Nov. 20, 1987

[51] Int. Cl.$^4$ ............................................. C08G 18/14
[52] U.S. Cl. .................................................... 521/137
[58] Field of Search ....................................... 521/137

[56] References Cited

U.S. PATENT DOCUMENTS 4,689,354  8/1987  Ramlow et al. .................... 521/137

Primary Examiner—Maurice J. Welsh

[57] ABSTRACT

Moldable energy absorbing rigid polyurethane foams are prepared by reacting a polyoxyalkylene polyether polyol containing therein a graft polymer dispersion, an alkylene oxide adduct of an aromatic amine in the presence of a crosslinking agent with an organic polyisocyanate. Alternatively, the aromatic amine may be replaced with an alkylene oxide adduct of pentaerythritol, ethylenediamine, α-methylglucoside, sorbitol and sucrose. The products are useful in various automobile body parts.

6 Claims, No Drawings

MOLDABLE ENERGY ABSORBING RIGID POLYURETHANE FOAMS

BACKGROUND OF THE INVENTION

1. Field of the Invention

The present invention pertains to rigid foam compositions and in particular to rigid polyurethane foam compositions and methods for the preparation thereof. More particularly, the present invention relates to the preparation of moldable energy absorbing rigid polyurethane foam compositions.

2. Description of the Prior Art

U.S. Pat. Nos. 4,614,754 and 4,664,563 teach the preparation of rigid foams employing alkylene oxide adducts of toluenediamine. U.S. Pat. No. 4,469,822 teaches the preparation of rigid foams with alkylene oxide adducts of toluenediamine mixed with other initiators. U.S. Pat. No. 4,555,531 teaches the preparation of rigid foams using alkylene oxide adducts of alkanolamines. U.S. Pat. No. 4,585,807 teaches the preparation of rigid foams employing alkylene oxide adducts of ethylene diamine.

SUMMARY OF THE INVENTION

The present invention applies to moldable energy absorbing rigid polyurethane foam compositions, which are prepared by the reaction of a graft polymer dispersion in a polyoxyalkylene polyether polyol with an alkylene oxide adduct of toluenediamine or diaminodiphenylmethane with an organic polyisocyanate in the presence of a crosslinking agent.

For a more complete understanding of the present invention, reference is made to the following detailed description and the examples thereof.

DESCRIPTION OF THE PREFERRED EMBODIMENTS

It has unexpectedly been found that, in the preparation of rigid polyurethane foam products moldable energy absorbing properties are obtained by reacting a polyoxyethylene polyether polyol containing therein a graft polymer dispersion with an alkylene oxide adduct of an aromatic diamine in the presence of a crosslinking agent.

The alkylene oxide adducts of the aromatic diamines are prepared by reacting the alkylene oxides with 2,3-, 2,6-, 3,4-, 2,5- and 2,4-toluenediamine or with diaminodiphenylmethane. The procedures employed are those well known to those skilled in the art.

Any suitable alkylene oxide may be used such as ethylene oxide, propylene oxide, butylene oxide, amylene oxide and mixtures of these oxides. Preferred are ethylene oxide and propylene oxide wherein the ethylene oxide content is less than about 35 weight percent of the adduct. Additionally, 2,2'-, 2,4'-, and 4,4'-diaminodiphenylmethane may be reacted with alkylene oxides. The molecular weights of these adducts may range from about 400 to about 800. The amounts of these amines adducts may range from about 0 weight percent to about 50 weight percent based on the total weight of the foam composition, preferably from about 5 weight percent to about 40 weight percent based on the total weight of the foam composition. Alternatively, the moldable energy absorbing rigid polyurethane foam compositions may be prepared by the reaction of a graft polymer dispersion in a polyoxyalkylene polyether polyol with an alkylene oxide adduct of compounds selected from the group consisting of pentaerythritol, ethylenediamine α-methylglucoside, sorbitol and sucrose with an organic polyisocyanate in the presence of a crosslinking agent. The alkylene oxides used may be ethylene oxide, propylene oxide and butylene oxide. The molecular weights of these adducts may range from about 250 to about 800. The amounts employed may range from about 0 weight percent to about 50 weight percent based on the total weight of the foam composition. Preferably the amounts range from about 5 weight percent to about 40 weight percent based on the total weight of the foam composition. Preferably the ethylene oxide content is less than 35 weight percent of the adduct. The products of this invention are useful in various automobile body parts.

The graft polymer dispersions employed are prepared by a process employing free radical polymerization of ethylenically unsaturated monomer or monomers in a polyol mixture containing less than 0.1 mole of induced unsaturation per mole of polyol mixture. These dispersions may be prepared by employing radical polymerization in a polyetherester polyol-polyoxy-alkylene polyether polyol mixture containing less than 0.1 mole of induced unsaturation per mole of polyol mixture wherein the unsaturation moiety is an isomerized maleate containing polyetherester polyol. These dispersions may be prepared by conducting the free radical polymerization in the presence of a polyetherester polyol which was prepared by reacting a polyether polyol, a polycarboxylic acid anhydride, and an alkylene oxide in the presence of an effective amount of a catalyst selected from the group consisting of salts and oxides of divalent metals.

The graft polymer dispersion may be prepared by the polymerization of an ethylenically unsaturated monomer or mixture of monomers in the presence of an effective amount of a free radical initiator in an unsaturation containing polyol mixture containing less than 0.1 mole of unsaturation per mole of polyol mixture employs an improved process which comprises conducting the polymerization in a polyol mixture employing as part of the mixture a polyether ester polyol prepared by the reaction of a polyoxyalkylene polyether polyol with maleic anhydride and an alkylene oxide. This polyether-ester polyol is isomerized by methods well known by those skilled in the art. These include heat, or isomerization catalysts such as morpholine, dibutylamine. diethylamine, diethanolamine, thiols and the like. Another process for the preparation of these graft polymer dispersions, consists of preparing a polyetherester polyol by the reaction of a poloxyalkylene ether polyol, a polycarboxylic acid anhydride to form a half acid ester and an alkylene oxide to obtain a product having an acid number of less than 5 mg KOH/gram which comprises conducting the reaction between the polyoxyalkylene polyether polyol and the anhydride and the following reaction with the alkylene oxide in the presence of an effective amount of a catalyst selected from the group consisting of salts and oxides of divalent metals. The polyols having induced unsaturation are hereinafter referred to as "macromers."Chain transfer agents may be employed as reaction moderators particularly at temperatures below 105° C. The polymerization reaction may be carried out at temperatures between 25° C. and 180° C., preferably between 80° C. and 135° C. The polyol mixture contains less than 0.1 mole of unsaturation per mole of polyol mixture and ranges from 0.001 to 0.09 mole of unsaturation.

The alkylene oxides which may be employed for the preparation of the polyetherester polyols include ethylene oxide, propylene oxide, butylene oxide, amylene oxide and mixtures of these oxides.

The graft polymer dispersion employed have viscosities less than 10,000 cps at 25° C. Preferably they have viscosities ranging from 2000 to 8000 cps at 25° C.

Among those chain transfer agents which may be employed are as follows: acetic acid, bromoacetic acid, chloroacetic acid, ethyl dibromoacetate, iodoacetic acid, tribromoacetic acid, ethyl tribromoacetate, trichloroacetic acid, ethyl trichloroacetate, acetone, p-bromophenylacetonitrile, p-nitrophenylacetylene, allyl alcohol, 2,4,6-trinitroaniline, p-ethynylanisole, 2,4,6-trinitroanisole, azobenzene, benzaldehyde, p-cyanobenzaldehyde, 2-butylbenzene, bromobenzene, 1,3,5-trinitrobenzene, benzochrysene, ethyl trinitrobenzoate, benzoin, benzonitrile, benzopyrene, tributylborane, 1,4-butanediol, 3,4-epoxy-2-methyl-1-butene, t-butyl ether, t-butyl isocyanide, 1-phenylbutyne, p-cresol, p-bromocumene, dibenzonaphthacene, p-dioxane, pentaphenyl ethane, ethanol, 1,1-diphenylethylene, ethylene glycol, ethyl ether, fluorene, N,N-dimethylformamide, 2-heptene, 2-hexene, isobutyraldehyde, diethyl bromomalonate, bromotrichloromethane, dibromoethane, diiodomethane, naphthalene, 1-naphthol, 2-napthol, methyl oleate, 2,4,4-triphenyl-1-pentene, 4-methyl-2-pentene, 2,6-diisopropylphenol, phenyl ether, phenylphosphine, diethylphosphine, dibutylphosphine, phosphorous trichloride, 1,1,1-tribromopropane, dialkyl phthalate, 1,2-propanediol, 3-phosphinopropionitrile, 1-propanol, pyrocatechol, pyrogallol, methyl stearate, tetraethylsilane, triethylsilane, dibromostilbene, α-bromostyrene, α-methylstyrene, tetraphenyl succinonitrile, 2,4,6-trinitrotoluene, p-toluidine, N,N-dimethyl-p-toluidine, α-cyano-p-tolunitrile, α,α'-dibromo-p-xylene, 2,6-xylenol, diethyl zinc, dithiodiacetic acid, ethyl dithiodiacetic acid, 4,4'-dithio-bisanthranilic acid, benzenethiol, o-ethoxybenzenethiol, 2,2'-dithiobisbenzothiazole, benzyl mixtures thereof. Alkylene oxide adducts of compounds which contain 2 or more different groups within the above-defined classes may also be used, for example, amino alcohols which contain an amino group and a hydroxyl group. Also, alkylene oxide adducts of compounds which contain one SH group and one OH group as well as those which contain an amino group and an SH group may be used. Generally, equivalent weight of the polyols will vary from 100 to 10,000, preferably from 1000 to 3000.

Any suitable hydroxy-terminated polyester may be used such are prepared, for example, from polycarboxylic acids and polyhydric alcohols. Any suitable polycarboxylic acid may be used such as oxalic acid, malonic acid, succinic acid, glutaric acid, adipic acid, pimelic acid, suberic acid, azeleic acid, sebacic acid, brassylic acid, thapsic acid, maleic acid, fumaric acid, glutaconic acid, α-hydromuconic acid, α-hydromuconic acid, α-butyl-α-ethyl-glutaric acid, α,β-diethylsuccinic acid, isophthalic acid, terephthalic acid, hemimellitic acid, and 1,4-cyclohexanedicarboxylic acid. Any suitable polyhydric alcohol, including both aliphatic and aromatic, may be used such as ethylene glycol, propylene glycol, trimethylene glycol, 1,2-butanediol, 1,3-butanediol, 1,4-butanediol, 1,2-pentanediol, 1,4-pentanediol, 1,5-pentanediol, 1,6-hexanediol, 1,7-heptanediol, glycerol, 1,1,1-trimethylolpropane, 1,1,1-trimethylolethane, 1,2,6-hexanetriol, α-methyl glucoside, pentaerythritol, and sorbitol. Also included within the term "polyhydric alcohol" are compounds derived from phenol such as 2,2-bis(4-hydroxyphenyl)propane, commonly known as Bisphenol A.

The hydroxyl-containing polyester may also be a polyester amide such as is obtained by including some amine or amino alcohol in the reactants for the preparation of the polyesters. Thus, polyester amides may be obtained by condensing an amino alcohol such as ethanolamine with the polycarboxylic acids set forth above or they may be made using the same components that make up the hydroxyl containing polyester with only a portion of the components being a diamine such as ethylene diamine.

Any suitable polyoxyalkylene polyether polyol may be used such as the polymerization product of an alkylene oxide or a mixture of alkylene oxides with a polyhydric alcohol. Any suitable polyhydric alcohol may be used such as those disclosed above for use in the preparation of the hydroxy-terminated polyesters. Any suitable alkylene oxide may be used such as ethylene oxide, propylene oxide, butylene oxide, amylene oxide, and mixtures of these oxides. The polyoxyalkylene polyether polyols may be prepared from other starting materials such as tetrahydrofuran and alkylene oxide-tetrahydrofuran mixtures; epihalohydrins such as epichlorohydrin; as well as aralkylene oxides such as styrene oxide. The polyoxyalkylene polyether polyols may have either primary or secondary hydroxyl groups. Included among the polyether polyols are polyoxyethylene glycol, polyoxypropylene glycol, polyoxybutylene glycol, polytetramethylene glycol, block copolymers, for example, combinations of polyoxypropylene and polyoxyethylene glycols, poly-1,2-oxybutylene and polyoxyethylene glycols, poly-1,4-oxybutylene and polyoxyethylene glycols, and random copolymer glycols prepared from blends of two or more alkylene oxides or by the sequential addition of two or more alkylene oxides. The polyoxyalkylene polyether polyols may be prepared by any known process such as, for example, the process disclosed by Wurtz in 1859 and *Encyclopedia of Chemical Technology*, Vol. 7, pp. 257–262, published by Interscience Publishers, Inc. (1951) or in U.S. Pat. No. 1,922,459. Polyethers which are preferred include the alkylene oxide addition products of trimethylolpropane glycerine, pentaerythritol, sucrose, sorbitol, propylene glycol, and 2,2'-(4,4'-hydroxyphenyl) propane and blends thereof having equivalent weights of from 100 to 5000.

Suitable polyhydric polythioethers which may be condensed with alkylene oxides include the condensation product of thiodiglycol or the reaction product of a dicarboxylic acid such as is disclosed above for the preparation of the hydroxyl-containing polyesters with any other suitable thioether glycol.

Polyhydroxyl-containing phosphorus compounds which may be used include those compounds disclosed in U.S. Pat. No. 3,639,542. Preferred polyhydroxyl-containing phosphorus compounds are prepared from alkylene oxides and acids of phosphorus having a $P_2O_5$ equivalency of from about 72 percent to about 95 percent.

Suitable polyacetals which may be condensed with alkylene oxides include the reaction product of formaldehyde or other suitable aldehyde with a dihydric alcohol or an alkylene oxide such as those disclosed above.

Suitable aliphatic thiols which may be condensed with alkylene oxides include alkanethiols containing at least two -SH groups such as 1,2-ethanedithiol, 1,2- propanedithiol, 1,3-propanedithiol, and 1,6-hexanedithiol; alkene thiols such as 2-butene-1,4-dithiol; and alkyne thiols such as 3-hexyne-1,6-dithiol.

Suitable amines which may be condensed with alkylene oxides include aromatic amines such as aniline, o-chloroaniline, p-aminoaniline, 1,5-diaminonaphthalene. methylene dianiline the condensation products of aniline and formaldehyde, and 2,3- 2,6-, 3,4-, 2,5-, and 2,4-diaminotoluene: aliphatic amines such as methylamine. triisopropanolamine, ethylenediamine, 1,3-diaminopropane, 1.3-diaminobutane, and 1,4-diaminobutane.

Also, polyols containing ester groups can be employed in the subject invention. These polyols are prepared by the reaction of an alkylene oxide with an organic dicarboxylic acid anhydride and a compound containing reactive hydrogen atoms. A more comprehensive discussion of these polyols and their method of preparation can be found in U.S. Pat. Nos. 3,585,185; 3,639,541 and 3,639,542.

The unsaturated polyols or macromers which are employed in the present invention may be prepared by the reaction of any conventional polyol such as those described above with an organic compound having both ethylenic unsaturation and a hydroxyl, carboxyl, anhydride, isocyanate or epoxy group or they may be prepared by employing an organic compound having both ethylenic unsaturation and a hydroxyl, carboxyl, anhydride, or epoxy group as a reactant in the preparation of the conventional polyol. Representative of such organic compounds include unsaturated mono- and polycarboxylic acids and anhydrides such as maleic acid and anhydride, fumaric acid, crotonic acid and anhydride, propenyl succinic anhydride, acrylic acid, acryloyl chloride, hydroxy ethyl acrylate or methacrylate and halogenated maleic acids and anhydrides, unsaturated polyhydric alcohols such as 2-butene-1,4-diol, glycerol allyl ether, trimethylolpropane allyl ether, pentaerythritol allyl ether, pentaerythritol vinyl ether, pentaerythritol diallyl ether, and 1-butene-3,4-diol, unsaturated epoxides such as 1-vinylcyclohexene-3,4-epoxide, butadiene monoxide, vinyl glycidyl ether(1-vinyloxy-2,3-epoxy propane), glycidyl methacrylate and 3-allyloxypropylene oxide (allyl glycidyl ether). If a polycarboxylic acid or anhydride is employed to incorporate unsaturation into the polyols, it is preferable to react the unsaturated polyol with an alkylene oxide, preferably ethylene or propylene oxide, to replace the carboxyl groups with hydroxyl groups prior to employment in the present invention. The amount of alkylene oxide employed is such as to reduce the acid number of the unsaturated polyol to about 5 or less.

The maleated macromers are isomerized at temperatures ranging from 80° C. to 120° C. for one-half hour to three hours in the presence of an effective amount of an isomerization catalyst. The catalyst is employed at concentrations greater than 0.01 weight percent based on the weight of the macromer.

When preparing the polyetherester polyol employing the catalyst selected from the group consisting of salts and oxides of divalent metals, the concentration of catalyst which may be employed ranges from 0.005 to 0.5 weight percent based on the weight of polyol mixture. The temperatures employed range from 75° C. to 175° C. The equivalent weight of the macromer may vary from 1000 to 15,000, preferably from 2000 to 6000.

Among the divalent metals which may be employed are: zinc acetate, zinc chloride, zinc oxide, zinc neodecanoate, tin chloride, calcium naphthenate, calcium chloride, calcium oxide, calcium acetate, copper naphthenate, cadmium acetate, cadmium chloride, nickel chloride, manganese chloride, and manganese acetate.

Certain of the above-mentioned catalysts such as calcium naphthenate promote the isomerization of the maleate to the fumarate structure during the preparation of the macromer, while others such as zinc chloride, which is an effective catalyst for the polymerization, inhibit this isomerization.

As mentioned above, the graft polymer dispersions of the invention are prepared by the in situ polymerization, in the above-described polyols of an ethylenically unsaturated monomer or a mixture of ethylenically unsaturated monomers. Representative ethylenically unsaturated monomers which may be employed in the present invention include butadiene, isoprene, 1,4-pentadiene, 1,6-hexadiene, 1,7-octadiene, styrene, α-methylstyrene, 2-methylstyrene, 3-methylstyrene and 4-methylstyrene, 2,4-dimethylstyrene, ethylstyrene, isopropylstyrene, butylstyrene, phenylstyrene, cyclohexylstyrene, benzylstyrene, and the like; substituted styrenes such as cyanostyrene, nitrostyrene, N,N-dimethylaminostyrene, acetoxystyrene, methyl 4-vinylbenzoate, phenoxystyrene, p-vinylphenyl oxide, and the like; the acrylic and substituted acrylic monomers such as acrylonitrile, acrylic acid, methacrylic acid, methyl acrylate, 2-hydroxyethyl acrylate, methyl methacrylate, cyclohexyl methacrylate, benzyl methacrylate, isopropyl methacrylate, octyl methacrylate, methacrylonitrile, ethyl α-ethoxyacrylate, methyl α-acetaminoacrylate, butyl acrylate, 2-ethylhexyl acrylate, phenyl acrylate, phenyl methacrylate, N,N-dimethylacrylamide, N,N-dibenzylacrylamide, N-butylacrylamide, methacryl formamide, and the like: the vinyl esters, vinyl ethers, vinyl ketones, etc., such as vinyl acetate, vinyl butyrate, isopropenyl acetate, vinyl formate, vinyl acrylate, vinyl methacrylate, vinyl methoxyacetate, vinyl benzoate, vinyltoluene, vinylnaphthalene, vinyl methyl ether, vinyl ethyl ether, vinyl propyl ethers, vinyl butyl ethers, vinyl 2-ethylhexyl ether, vinyl phenyl ether, vinyl 2-methoxyethyl ether, methoxybutadiene, vinyl 2-butoxyethyl ether, 3,4-dihydro-1,2-pyran, 2-butoxy-2'-vinyloxy diethyl ether, vinyl methyl ketone, vinyl ethyl ketone, vinyl phosphonates such as vinyl phenyl ketone, vinyl ethyl sulfone, N-methyl-N-vinyl acetamide, N-vinyl-pyrrolidone, vinyl imidazole, divinyl sulfoxide, divinyl sulfone, sodium vinylsulfonate, methyl vinylsulfonate, N-vinyl pyrrole, and the like: dimethyl fumarate, dimethyl maleate, maleic acid, crotonic acid, fumaric acid, itaconic acid, monomethyl itaconate, t-butylaminoethyl methacrylate, dimethylaminoethyl methacrylate, glycidyl acrylate, allyl alcohol, glycol monoesters of itaconic acid, vinyl pyridine, vinyl chloride vinylidene chloride and the like. Any of the known polymerizable monomers can be used and the compounds listed above are illustrative and not restrictive of the monomers suitable for use in this invention. Preferably, the monomer is selected from the group consisting of acrylonitrile, styrene and mixtures thereof.

The amount of ethylenically unsaturated monomer employed in the polymerization reaction is generally from 25 percent to 60 percent, preferably from 30 percent to 50 percent, based on the total weight of the product. The polymerization occurs at a temperature between about 25° C. and 180° C., preferably from 80° C. to 135° C.

Illustrative polymerization initiators which may be employed are the well-known free radical types of vinyl polymerization initiators such as the peroxides, persulfates, perborates, percarbonates, azo compounds, etc. These include hydrogen peroxide, dibenzoyl peroxide, acetyl peroxide, benzoyl hydroperoxide, t-butyl hydroperoxide, di- t-butyl peroxide, lauroyl peroxide, butyryl peroxide, diisopropylbenzene hydroperoxide, cumene hydroperoxide, paramenthane hydroperoxide, diacetyl peroxide, di-α-cumyl peroxide, dipropyl peroxide, diisopropyl peroxide, isopropyl-t-butyl peroxide, butyl-t-butyl peroxide, difuroyl peroxide, bis(triphenylmethyl) peroxide, bis(p-methoxybenzoyl) peroxide, p-monomethoxybenzoyl peroxide, rubene peroxide, ascaridol, t-butyl peroxybenzoate, diethyl peroxyterephthalate, propyl hydroperoxide, isopropyl hydroperoxide, n-butyl hydroperoxide, t-butyl hydroperoxide, cyclohexyl hydroperoxide, trans-decalin hydroperoxide, α-methylbenzyl hydroperoxide, α-methyl-α-ethyl benzyl hydroperoxide, tetralin hydroperoxide, triphenylmethyl hydroperoxide, diphenylmethyl hydroperoxide, α,α'-azobis-(2-methyl heptonitrile), 1,1'-azo-bis(cyclohexane carbonitrile), 4,4'-azobis(4-cyanopentanoic acid), 2,2'-azobis(isobutyronitrile), 1-t-butylazo-1-cyanocyclohexane, persuccinic acid, diisopropyl peroxy dicarbonate, 2,2'-azobis(2,4-dimethylvaleronitrile), 2-t-butylazo-2-cyano-4-methoxy-4-methylpentane, 2,2'-azobis 2-methylbutanenitrile, 2-t-butylazo-2-cyanobutane, 1-t-amylazo-1-cyanocyclohexane, 2,2'-azobis-(2,4-dimethyl-4-methoxyvaleronitrile), 2,2'-azobis-2-methyl-butyronitrile, 2-t-butylazo-2-cyano-4-methylpentane, 2-t-butylazo-2-isobutyronitrile, butylperoxyisopropyl carbonate and the like; a mixture of initiators may also be used. The preferred initiators are 2,2'-azobis(2-methylbutyronitrile), 2,2'-azobis(isobutyronitrile), 2,2'-azobis(2,4-dimethylvaleronitrile), 2-t-butylazo-2-cyano-4-methoxy-4-methylpentane, 2-t-butylazo-2-cyano-4-methylpentane, 2-t-butylazo-2-cyano-butane and lauroyl peroxide. Generally, from about 0.1 percent to about 10 percent, preferably from about 1 percent to about 4 percent, by weight of initator based on the weight of the monomer will be employed in the process of the invention.

The polyurethane foams employed in the present invention are generally prepared by the reaction of a graft polymer dispersion and an alkylene oxide adduct of an initiator having from 4 to 8 active hydrogen atoms with an organic polyisocyanate in the presence of a blowing agent and optionally in the presence of additional polyhydroxylcontaining components, chain extending agents, catalysts, surface-active agents, stabilizers, dyes, fillers, flame retardants and pigments. Suitable processes for the preparation of cellular polyurethane plastics are disclosed in U.S. Reissue Pat. No. 24,514 together with suitable machinery to be used in conjunction therewith. When water is added as the blowing agent, corresponding quantities of excess isocyanate to react with the water and produce carbon dioxide may be used. It is possible to proceed with the preparation of the polyurethane plastics by a prepolymer technique wherein an excess of organic polyisocyanate is reacted in a first step with the polyol of the present invention to prepare a prepolymer having free isocyanate groups which is then reacted in a second step with water and/or additional polyol to prepare a foam. Alternatively, the components may be reacted in a single working step commonly known as the "one-shot" technique of preparing polyurethanes. Furthermore, instead of water, low boiling hydrocarbons such as pentane, hexane, heptane, pentene, and heptene; azo compounds such as azohexahydrobenzodinitrile; halogenated hydrocarbons such as dichlorodifluoromethane, trichlorofluoromethane, dichlorodifluoroethane, vinylidene chloride, and methylene chloride may be used as blowing agents.

Organic polyisocyanates which may be employed include aromatic, aliphatic, and cycloaliphatic polyisocyanates and combinations thereof. Representative of these types are the diisocyanates such as m-phenylene diisocyanate, 2,4-toluene diisocyanate, 2,6-toluene diisocyanate, mixtures of 2,4- and 2,6-toluene diisocyanate, hexamethylene diisocyanate, tetramethylene diisocyanate, cyclohexane-1,4-diisocyanate, hexahydrotoluene diisocyanate (and isomers), naphthalene-1,5-diisocyanate, 1-methoxyphenyl-2,4-diisocyanate, 4,4'-diphenylmethane diisocyanate, 4,4'-biphenylene diisocyanate, 3,3'-dimethoxy-4,4'-biphenyl diisocyanate, 3,3'-dimethyl-4,4'-biphenyl diisocyanate and 3,3'-dimethyl-diphenylmethane-4,4'-diisocyanate; the triisocyanates such as 4,4',4"-triphenylmethane triisocyanate, and toluene 2,4,6-triisocyanate; and the tetraisocyanates such as 4,4'-dimethyldiphenylmethane-2,2'-5,5'-tetraisocyanate and polymeric polyisocyanates such as polymethylene polyphenylene polyisocyanate. Preferred are toluene diisocyanate, 4,4'-diphenylmethane diisocyanate and polymethylene polyphenylene polyisocyanate.

Crude polyisocyanates may also be used in the compositions of the present invention, such as crude toluene diisocyanate obtained by the phosgenation of a mixture of toluene diamines or crude diphenylmethane isocyanate obtained by the phosgenation of crude diphenylmethane diamine. Also preferred are the crude isocyanates as disclosed in U.S. Pat. No. 3,215,652.

As mentioned above, the graft polyols may be employed along with another polyhydroxyl-containing componet commonly employed in the art. Any of the polyhydroxylcontaining components which are described above for use in the preparation of the graft polyols may be employed in the preparation of the polyurethane foams useful in the present invention.

Chain-extending agents which may be employed in the preparation of the polyurethane foams include those compounds having at least two functional groups bearing active hydrogen atoms such as water, hydrazine, primary and secondary diamines, amino alcohols, amino acids, hydroxy acids, glycols, or mixtures thereof. A preferred group of chain-extending agents includes water, ethylene glycol, glycerine, trimethylolpropane, 1,4-butanediol and primary and secondary diamines such as phenylene diamine, 1,4-cyclohexane-bis-(methylamine), ethylenediamine, diethylenetriamine, N-(2-hydroxypropyl) ethylenediamine, N,N'-di(2-hydroxypropyl)ethylenediamine, N,N,N',N'-tetra(2-hydroxypropyl)ethylenediamine, piperazine, and 2-methylpiperazine.

Any suitable catalyst may be used including tertiary amines such as, for example, triethylenediamine, N-methylmorpholine, N-ethylmorpholine, diethylethanolamine, N-cocomorpholine, 1-methyl-4-dimethylaminoethylpiperazine, 3-methoxypropyldimethylamine, N,N,N'-trimethylisopropyl propylenediamine, 3-diethylaminopropyldiethylamine, dimethylbenzylamine, and the like. Other suitable catalysts are, for example, dibutyltin dilaurate, dibutyltindiacetate, stannous chloride, dibutyltin di-2-ethyl hexanoate, stannous oxide, as well as other organometallic compounds such as are disclosed in U.S. Pat. No. 2,846,408.

A surface-active agent is generally necessary for production of high grade molded polyurethane foam according to the present invention, since in the absence of same, the foams collapse or contain very large uneven cells. Numerous surface-active agents have been found satisfactory. Nonionic surface active agents are preferred. Of these, the nonionic surface-active agents such as the well-known silicones have been found particularly desirable. Other surface-active agents which are operative, although not preferred, include polyethylene glycol ethers of long chain alcohols, tertiary amine or alkanolamine salts of long chain alkyl acid sulfate esters, alkyl sulfonic esters, and alkyl arylsulfonic acids.

Among the flame retardants which may be employed are: pentabromodiphenyl oxide, dibromopropanol, tris($\beta$-chloropropyl)phosphate, 2,2-bis(bromoethyl) 1,3-propanediol, tetrakis(2-chloroethyl) ethylene diphosphate, tris(2,3-dibromopropyl)phosphate, tris($\beta$-chloroethyl)-phoshate, tris(1,2-dichloropropyl)phosphate, bis-(2-chloro-ethyl) 2-chloroethylphosphonate, molybdenum trioxide, ammonium molybdate, ammonium phosphate, pentabromodiphenyloxide, tricresyl phosphate, hexabromocyclododecane and dibromoethyl- dibromocyclohexane. The concentrations of flame retardant compounds which may be employed range from 5 to 25 parts per 100 parts of polyol mixture.

The following examples illustrate the nature of the invention. All parts are by weight unless otherwise designated. In the Examples below the following abbreviations are employed.

Polyol A is an ethylene oxide-propylene oxide adduct of propylene glycol containing 25 percent ethylene oxide as a cap and containing 50 percent of 2:1 acrylonitrile:styrene. The macromer employed was a fumarated glycerine polyol containing a 5 percent ethylene oxide cap having a hydroxyl number of about 25.

Polyol B was a propylene oxide adduct of vicinal toluenediamine having a hydroxyl number of about 390.

Polyol C was similar to Polyol A except the polymer dispersion was 2:1 styrene:acrylonitrile. The macromer was a fumarated trimethylolpropane polyol containing a 5 percent ethylene oxide cap having a hydroxyl number of about 25.

Polyol D was a propylene oxide-ethylene oxide adduct of glycerine containing 75 percent ethylene oxide having a hydroxyl number of about 46.

Polyol E was a propylene oxide-ethylene oxide adduct of propylene glycol containing a 25 percent ethylene oxide cap having a hydroxyl number of about 145.

Polyol F was a propylene oxide adduct of propylene glycol containing 50 percent of 2:1 acrylonitrile:styrene having a hydroxyl number of about 69.

Polyol G was a propylene oxide-ethylene oxide adduct of vicinal toluenediamine containing a 75 percent ethylene oxide cap having a hydroxyl number of about 450.

Quadrol ® is a propylene oxide adduct of ethylendiamine having a hyroxyl number of about 767.

Isocyanate A was a polymeric polymethylene polyphenylene polyisocyanate having a functionality of about 2.8.

Isocyanate B was a polymeric polymethylene polyphenylene polyisocyanate having a functionality of about 2.4.

Isocyanate C was a polymeric polymethylene polyphenylene polyisocyanate having a functionality of about 2.7.

R8020 is a catalyst sold by Air Products Corporation.
T-12 is a catalyst sold by Air Products Corporation.
DMEA is dimethylethanolamine.
33LV is a catalyst sold by Air Products Corporation.
L-550 is a silicone surfactant sold by Union Carbide Corporation.
F-llA is a fluorocarbon sold by duPont Corporation.
UL1 is a catalyst sold by Fomrez Corporation.

The following formulations were employed for the examples:

| Formulation | A | B | C | D | E | F |
|---|---|---|---|---|---|---|
| Polyol A | 50.00 | 55.00 | 50.00 | 50.00 | — | — |
| Polyol B | 35.00 | 35.00 | 35.00 | 35.00 | 35.00 | 35.00 |
| Polyol C | — | — | — | — | 51.00 | 51.00 |
| Polyol D | — | — | — | — | — | 3.00 |
| Glycerine | 15.00 | 15.00 | 15.00 | 15.00 | 15.00 | 15.00 |
| Water | — | 1.00 | 1.00 | 1.00 | 1.00 | 1.00 |
| R8020 | 0.50 | 0.50 | 0.50 | — | 0.50 | 0.50 |
| T-12 | 0.03 | 0.03 | 0.03 | 0.05 | 0.03 | 0.03 |
| DMEA | — | — | — | 0.60 | — | — |
| 33LV | — | — | — | 0.30 | — | — |
| F11A | 60.00 | 60.00 | 60.00 | 60.00 | 60.00 | 60.00 |
| L-550 | 0.80 | 0.80 | 0.80 | 0.80 | 0.80 | 0.80 |

Isocyanate A was used fo all Examples except Isocyanate B was used for Examples 22, 23 and 26, and Isocyanate C was used for Example 27.

| Formulation | G | H | I | J | K |
|---|---|---|---|---|---|
| Polyol A | 50.00 | 70.00 | 50.00 | 57.50 | 61.20 |
| Polyol B | 35.00 | 15.00 | 35.00 | 35.00 | 35.00 |
| Polyol D | — | — | 5.00 | — | — |
| Glycerine | 15.00 | 15.00 | 15.00 | 7.50 | 3.75 |
| Water | 1.00 | 2.50 | 1.00 | 2.50 | 2.50 |
| R8020 | — | 0.75 | 0.50 | 0.50 | 0.50 |
| T-12 | 0.03* | 0.03 | 0.03 | 0.03 | 0.03 |
| DMEA | 0.60 | — | — | — | — |
| 33LV | 0.30 | — | — | — | — |
| F-11A | 30.00 | 45.00 | 60.00 | 45.00 | 45.00 |
| L-550 | 0.80 | 0.80 | 0.80 | 0.80 | 0.80 |

*UL1 was employed instead of T-12

| Formulation | L | M | N | O | P | Q | R |
|---|---|---|---|---|---|---|---|
| Polyol A | 63.10 | 37.5 | 25.00 | 12.50 | — | — | 80.00 |
| Polyol B | 35.00 | 35.00 | 35.00 | 35.00 | 35.00 | 35.00* | 5.00 |
| Polyol E | — | 12.50 | 25.00 | 37.50 | 50.00 | 50.00 | — |
| Glycerine | 1.90 | 15.00 | 15.00 | 15.00 | 15.00 | 15.00 | 15.00 |
| Water | 2.50 | 1.00 | 1.00 | 1.00 | 1.00 | 1.00 | 2.50 |
| R8020 | 0.50 | 0.80 | 0.80 | 0.80 | 0.80 | 0.70 | 1.00 |
| T-12 | 0.03 | 0.03 | 0.03 | 0.03 | 0.03 | 0.03 | 0.03 |
| F-11A | 45.00 | 60.00 | 60.00 | 60.00 | 60.00 | 60.00 | 45.00 |
| L-550 | 0.80 | 0.80 | 0.80 | 0.80 | 0.80 | 0.80 | 0.80 |

*Polyl G was used instead of Polyol B

| Formulation | S | T | U | V | W |
|---|---|---|---|---|---|
| Polyol A | 70.00 | 60.00 | — | 50.00 | 50.00 |
| Polyol B | 15.00 | 25.00 | 35.00 | 35.00 | 35.00 |
| Polyol D | — | — | 5.00 | — | 5.00 |
| Polyol F | — | — | 50.00 | — | — |
| Glycerine | 15.00 | 15.00 | 15.00 | — | — |
| Quadrol | — | — | — | 15.00 | 15.00 |
| Water | 2.50 | 2.50 | 1.00 | 1.00 | 1.00 |
| R8020 | 1.00 | 1.00 | 1.25 | 0.35 | 0.50 |
| T-12 | 0.03 | 0.03 | 0.03 | 0.03 | 0.03 |
| F-11A | 45.00 | 45.00 | 60.00 | 60.00 | 60.00 |

-continued

| Formulation | S | T | U | V | W |
|---|---|---|---|---|---|
| L-550 | 0.80 | 0.80 | 0.80 | 0.80 | 0.80 |

EXAMPLES 1-25

Examples 1-25 were prepared on an EMB Puromat 30 injection molding machine. The equipment was set for the following parameters:

| Pump pressure | resin | 100 bar |
|---|---|---|
|  | isocyanate | 90 bar |
| Mix Head Temperature | resin | 22° C. |
|  | isocyanate | 26.7° C. |
| mold temperature between 43° C. to 51.7° C. | | |

The total output of the machine was 200 grams per second. The formulations as indicated below were injected into the center of the mold, one end of which was slightly elevated. The mold was closed after 6 seconds and the parts were demolded in from 6 to 10 minutes. The molded parts were cured for 3 days at room temperature prior to testing. The criteria for good energy absorbing foam is a value less than 28 psi at 50 percent deflection and less than 34 psi at 70 percent deflection.

TABLE I

| Example | 1 | 2 | 3 | 4 | 5 | 6 |
|---|---|---|---|---|---|---|
| Formulation | A | A | A | A | C | B |
| Index | 100 | 75 | 80 | 80 | 80 | 100 |
| Density | 2.00 | 3.40 | 2.40 | 1.94 | 2.15 | 1.74 |
| Compressive Strength %, psi Deflection | | | | | | |
| 50% | 10.90 | 9.30 | 9.50 | 12.50 | 17.30 | 11.60 |
| 70% | 13.40 | 11.10 | 11.40 | 15.00 | 20.00 | 14.50 |
| Example | 7 | 8 | 9 | 10 | 11 | 12 |
| Formulation | B | B | B | B | D | D |
| Index | 100 | 100 | 80 | 80 | 110 | 110 |
| Density | 2.60 | 1.94 | 1.72 | 2.32 | 2.10 | 3.90 |
| Compressive Strength %, psi Deflection | | | | | | |
| 50% | 20.50 | 13.00 | 9.90 | 14.00 | 14.00 | 17.80 |
| 70% | 25.00 | 19.00 | 12.00 | 15.30 | 16.30 | 19.80 |
| Example | 13 | 14 | 15 | 16 | 17 | 18 |
| Formulation | D | D | E | E | E | E |
| Index | 90 | 90 | 80 | 80 | 100 | 100 |
| Density | 3.20 | 1.75 | 1.96 | 2.47 | 1.94 | 2.90 |
| Compressive Strength %, psi Deflection | | | | | | |
| 50% | 22.10 | 25.40 | 12.00 | 13.50 | 13.00 | 22.80 |
| 70% | 24.10 | 27.80 | 12.70 | 14.30 | 14.80 | 23.90 |
| Example | 19 | 20 | 21 | 22 | 23 | 24 | 25 |
| Formulation | F | F | A | G | G | H | H |
| Index | 80 | 100 | 80 | 110 | 110 | 80 | 80 |
| Density | 2.70 | 2.85 | 2.45 | 5.14 | 3.24 | 2.14 | 2.63 |
| Compressive Strength %, psi Deflection | | | | | | | |
| 50% | 16.30 | 20.50 | 18.00 | 90.50 | 43.20 | 15.8 | 22.4 |
| 70% | 19.70 | 23.00 | 20.50 | 117.50 | 59.00 | 19.8 | 26.3 |

EXAMPLES 26-47

Examples 26-47 were prepared by weighing all of the components except the isocyanate component and thoroughly mixing. An appropriate amount of this resin was then weighed into a one quart cup. An appropriate amount of isocyanate was then added and mixed vigorously for 5 seconds. The mixture was poured into a No. 5 Lily cup and the foam was allowed to rise. This foam was cured for three days at room temperature. The physical properties were then determined.

TABLE II

| Example | 26 | 27 | 28 | 29* | 30 |
|---|---|---|---|---|---|
| Formulation | A | A | I | I | I |
| Index | 100 | 100 | 100 | 80 | 80 |
| Density | 1.27 | 1.36 | 1.56 | 1.54 | 1.34 |
| Compressive Strength %, psi Deflection | | | | | |
| 50% | 18.40 | 16.60 | 12.50 | 11.80 | 11.60 |
| 70% | 19.60 | 17.20 | 13.00 | 11.70 | 12.20 |
| Example | 32 | 33 | 34 | 35 | 36 |
| Formulation | H | J | K | L | A |
| Index | 80 | 80 | 80 | 80 | 80 |
| Density | 1.44 | 1.40 | 1.38 | 1.42 | 1.30 |
| Compressive Strength %, psi Deflection | | | | | |
| 50% | 14.60 | 14.00 | 9.70 | 8.50 | 11.00 |
| 70% | 15.10 | 13.80 | 14.50 | 9.30 | 10.70 |
| Example | 37 | 38 | 39 | 40 | 41 | 42 |
| Formulation | M | N | O | P | Q | R |
| Index | 80 | 80 | 80 | 80 | 80 | 80 |
| Density | 1.30 | 1.28 | 1.30 | 1.49 | 1.48 | 1.39 |
| Compressive Strength %, psi Deflection | | | | | | |
| 50% | 10.60 | 10.50 | 10.00 | 10.50 | 5.60 | 13.10 |
| 70% | 11.00 | 11.30 | 12.00 | 13.80 | 8.00 | 13.40 |
| Example | 43 | 44 | 45 | 46 | 47 |
| Formulation | S | T | U | V | W |
| Index | 80 | 80 | 80 | 80 | 80 |
| Density | 1.39 | 1.43 | 1.58 | 1.38 | 1.35 |
| Compressive Strength %, psi Deflection | | | | | |
| 50% | 13.00 | 13.90 | 9.00 | 5.50 | 5.10 |
| 70% | 13.00 | 14.20 | 12.50 | 7.50 | 8.00 |

*Example 29 employed 20 pbw of Polyol D.

The embodiments of the invention in which an exclusive privilege or property is claimed are defined as follows:

1. A moldable energy absorbing rigid foam having a compresison strength at 50 percent deflection of less than about 28 psi, and comprising the reaction product of
   (a) a polyoxyalkylene polyether polyol containing therein a graft polymer dispersion,
   (b) an alkylene oxide adduct of touenediamine or methylenedianiline having a molecular weight range of from about 400 to about 800,
   (c) a crosslinking agent selected from the group consisting of glycerine, trimethylolpropane and an alkylene oxide adduct of ethylene diamine containing from about 4 to about 8 alkylene oxide units,
   (d) an organic polyisocyanate, and
   (e) water, catalyst surfactant and an additional blowing agent.

2. The foam of claim 1 wherein the amine adduct (b) is from about 5 weight percent to about 40 weight percent based on the total weight of the foam.

3. A process for the preparation of a modable energy absorbing rigid foam having a compression strength at 50 percent deflection of less than about 28 psi, and comprising reacting
   (a) a polyoxyalkylene polyether polyol containing therein a graft polymer dispersion,
   (b) an alkylene oxide adduct of toluenediamine or methylenedianiline having a molecular weight range of from about 400 to about 800,
   (c) a crosslinking agent selected from the group consisting of glycerine, trimethylolpropane and an alkylene oxide adduct of ethylene diamine containing from about 4 to about 8 alkylene oxdie units,
   (d) an aromatic organic polyisocyanate, and
   (e) water, catalyst, surfactant and additional blowing agent.

4. The process of claim 3 wherein the amine adduct (b) is from about 5 weight percent to about 40 weight percent based on the total weight of the foam.

5. A moldable energy absorbing rigid foam comprising the reaction product of
   (a) a polyoxyalkylene polyether polyol containing therein a graft polymer dispersion,
   (b) an alkylene oxide adduct of compounds selected from the group consisting of pentaerythritol, ethylenediamine, α-methylglucoside, sorbitol and sucrose having a molecular weight of from about 250 to about 800
   (c) a crosslinking agent selected from the group consisting of glycerine, trimethylolpropane and an alkylene oxide adduct of ethylene diamine containing from about 4 to about 8 alkylene oxide units,
   (d) an organic polyisocyanate, and
   (e) water, catalyst, surfactant and an additional blowing agent.

6. The foam of claim 5 wherein the adducts of (b) are about 5 weight percent to about 40 weight percent based on the total weight of the foam.

* * * * *

UNITED STATES PATENT AND TRADEMARK OFFICE
CERTIFICATE OF CORRECTION

PATENT NO. : 4,866,102

DATED : September 12, 1989

INVENTOR(S) : Edward R. Pray, John R. Stoll, Peter F. Plank

It is certified that error appears in the above-identified patent and that said Letters Patent is hereby corrected as shown below:

On the title page, add:

--[73] Assignee: BASF Corporation, Wyandotte, MI--

Claim 3, at line 1 change "modable" to "moldable".

Signed and Sealed this

Nineteenth Day of February, 1991

Attest:

HARRY F. MANBECK, JR.

*Attesting Officer*     *Commissioner of Patents and Trademarks*